United States Patent [19]

Oshio et al.

[11] Patent Number: 4,937,027
[45] Date of Patent: Jun. 26, 1990

[54] METHOD OF MANUFACTURING CORROSION-RESISTANT CONCRETE OR MORTAR

[75] Inventors: Akira Oshio; Kazumi Jimbo; Shoji Shirokuni, all of Tokyo, Japan

[73] Assignee: Onoda Cement Co., Ltd., Yamaguchi, Japan

[21] Appl. No.: 243,776
[22] PCT Filed: Nov. 13, 1987
[86] PCT No.: PCT/JP87/00882
§ 371 Date: Jul. 11, 1988
§ 102(e) Date: Jul. 11, 1988
[87] PCT Pub. No.: WO88/03465
PCT Pub. Date: May 19, 1988

[30] Foreign Application Priority Data

Nov. 13, 1986 [JP] Japan .................. 61-270471
Nov. 6, 1987 [JP] Japan .................. 62-280552

[51] Int. Cl.$^5$ ............ B29C 39/12; B32B 31/00; C04B 41/00; C04B 41/45
[52] U.S. Cl. .................. 264/133; 264/132; 264/139; 264/246; 264/256
[58] Field of Search ........ 264/256, 133, 139, 162, 264/245, 246, 132; 428/703, 489, 497, 500, 522

[56] References Cited

U.S. PATENT DOCUMENTS

| | | | |
|---|---|---|---|
| 1,729,172 | 9/1929 | Lundin | 264/256 |
| 2,070,596 | 2/1937 | Hansen | 264/255 |
| 3,439,076 | 4/1969 | Loois | 264/256 X |
| 3,619,457 | 11/1971 | Chandler et al. | 264/DIG. 57 |
| 3,905,929 | 9/1975 | Noll | 524/839 |
| 3,929,706 | 12/1975 | Schmidt et al. | 524/825 |
| 3,941,864 | 3/1976 | Bosch et al. | 264/256 |
| 3,955,906 | 5/1976 | Murase et al. | 425/88 |
| 4,036,839 | 7/1977 | Plunguia et al. | 264/256 |
| 4,049,874 | 9/1977 | Aoyama et al. | 264/256 X |
| 4,060,581 | 11/1977 | Darby et al. | 264/256 X |
| 4,088,808 | 5/1978 | Cornwell et al. | 264/256 X |
| 4,115,316 | 9/1978 | Burke, Jr. | 528/501 X |
| 4,177,232 | 12/1979 | Day | 428/703 X |
| 4,213,926 | 7/1980 | Toyoda et al. | 264/256 X |
| 4,350,739 | 9/1982 | Mohiuddin | 264/255 X |
| 4,356,230 | 10/1982 | Emanuel et al. | 264/255 X |
| 4,428,994 | 1/1984 | Rawlins | 428/703 X |
| 4,435,472 | 3/1984 | Leah | 428/703 X |
| 4,476,657 | 10/1984 | Juba et al. | 264/256 X |
| 4,507,365 | 3/1985 | Lower et al. | 428/703 X |
| 4,536,417 | 8/1985 | Shimizu | 427/140 |
| 4,634,626 | 1/1987 | Yamaguchi et al. | 428/703 X |

FOREIGN PATENT DOCUMENTS

| | | | |
|---|---|---|---|
| 146915 | 3/1981 | Fed. Rep. of Germany | 428/703 |
| 1322174 | 2/1963 | France | 264/256 |
| 9118 | 1/1976 | Japan | 264/256 |
| 12233 | 1/1977 | Japan | 428/703 |
| 26523 | 2/1977 | Japan . | |
| 54718 | 5/1977 | Japan | 428/703 |
| 65518 | 5/1977 | Japan . | |
| 16051 | 2/1978 | Japan | 428/703 |
| 14417 | 6/1979 | Japan | 428/703 |
| 85763 | 6/1980 | Japan | 428/703 |
| 571626 | 1/1976 | Switzerland | 264/256 |

OTHER PUBLICATIONS

Treatise on Coatings, vol. 4 (in two parts) Formulations Part I (edited by Raymond R. Myers and J. S. Long).
Treatise on Coatings, vol. 1 (Part II) Film-Forming Compositions (edited by Raymond R. Myers and J. S. Long).

(List continued on next page.)

Primary Examiner—Jan H. Silbaugh
Assistant Examiner—Karen D. Kutach
Attorney, Agent, or Firm—Frishauf, Holtz, Goodman & Woodward

[57] ABSTRACT

A method of manufacturing corrosion-resistant concrete or mortar wherein a peelable film is formed on the inner surface of a formwork, and one or two paints of asphalt, tar, and thermosetting resin paints, or resin mortar using a thermosetting resin as a binder is coated on the peelable film. Concrete or mortar is molded using the formwork, and the formwork is removed after the concrete or mortar is cured, thereby transferring the corrosion-resistant film layer together with the peelable film onto the surface of the concrete or mortar.

6 Claims, 1 Drawing Sheet

OTHER PUBLICATIONS

UCAR Solution Vinyl Resins for Coatings–Union Carbide Chemical Abstracts vol. 64, 1966–48–Plastics Technology p. 6834 "Mechanics of Peeling".

Mechanics of Peeling. II. Time–Temperature Superposition Principle in the Breaking of Adhesion. Toshio Hata et al. Kobunshi Kagaku 22(239)160–5(1965).

Strippable Coatings, Y. M. Chandhok and S. N. Agarwal, Paint Manufacture, Jul. 1970.

Protective Coatings for Metals (3rd Ed.), R. M. Burns and W. W. Bradley Reinhold Publishing Corp.

Guide to United States Government Paint Specifications 15th Ed. Nat'l. Paint, Varnish & Lacquer Assoc., Inc., Jun. 1958.

4,937,027

METHOD OF MANUFACTURING CORROSION-RESISTANT CONCRETE OR MORTAR

TECHNICAL FIELD

The present invention relates to a method of manufacturing concrete or mortar having a corrosion-resistant film layer formed on its surface and, more particularly, to a method of manufacturing concrete or mortar, in which a corrosion-resistant film layer is formed on the surface of concrete or mortar simultaneously with demolding of the concrete or mortar.

BACKGROUND ART

Cement, concrete or mortar is widely used as an inexpensive construction material. However, these materials are damaged by an acid, salt, seawater, and an oil or under chemical environments such as carbonic acid gas and sulfurous acid gas. In order to compensate for this drawback, the surface of concrete is conventionally coated with a corrosive-resistant paint. This is called "coating" when a thin film having a thickness of 0.2 to 0.3 mm is formed and is called "lining" when a thick film having a thickness of 1 mm or more is formed. However, this distinction is not always clear.

Asphalt, tar, or a thermosetting resin paint is normally used in coating. In corrosion-resistant coating of a concrete structure, it is most important to cover the surface of concrete so that no pin-holes are left thereon. However, in practice, it is not easy to coat the surface of hardened concrete in such manner. That is, since a large number of large and small holes are present on the concrete surface, it is very difficult to coat the surface so that all the holes including pin-holes are completely covered. For this reason, in conventional techniques, the number of coating layers is increased or a primer treatment is performed to solve the above problem. However, these techniques require much labor. For example, in "Guides (Draft) for Salt Damage of Road Bridge and its Explanation" (Incorporated Body (Shadan Hojin) of Japan Road Association, issued on February, 1984), concrete painting systems for preventing salt damage are classified in three types of A, B, and C in accordance with using conditions of a structural member. In any of these painting systems, four steps of a primer treatment (first treatment) using an epoxy resin primer or a polyurethane resin primer, a putty treatment (second treatment) using an epoxy resin putty or a vinyl ester resin putty, intercoating (third treatment) using an epoxy resin paint, a polyurethane resin paint, or a vinyl ester resin paint, and over-coating (fourth treatment) using a polyurethane resin are required. In addition, it is standardized that an interval of one to ten days be provided between the steps. In order to improve adhesive properties between the film and the concrete to sufficiently achieve a corrosive preventing effect, materials which adversely affect painting such as a laitance, a mold releasing agent, attached salt, attached oil, and moisture must be removed. As a base treatment for this purpose, the surface is sanded, wiped with a thinner, cleaned by a brush, or dried by air blow.

However, these treatments are very troublesome and costly. In addition, a film formed even upon these treatments is easily peeled. Other examples of corrosion-resistant concrete are polymer-impregnated concrete and resin concrete. However, these examples are costly and hence are not suitable for use in general purposes.

According to the present invention, the inner surface of a formwork is coated beforehand to form the corrosion-resistant film thereon, and concrete or mortar is molded using this formwork. Then, a corrosion-resistant film layer is transferred onto the surface of the concrete or mortar at the same time the concrete or mortar is removed from the formwork. As a result, concrete or mortar having a good acid resistance can be easily obtained.

DISCLOSURE OF INVENTION

The first invention of the present application is characterized in that a peelable film is formed on the inner surface of a formwork, and one or two paints selected from the group consists of an asphalt paint, a tar paint, and a thermosetting resin paint, or resin mortar using a thermosetting resin as a binder is coated on the film to form a corrosion-resistant film layer thereon. Concrete or mortar is molded using this formwork, and the formwork is removed after the concrete or mortar is cured, thereby transferring the corrosion-resistant film layer together with the peelable film onto the surface of the concrete or mortar.

The second invention of the present application is characterized in that a thermoplastic acrylic resin paint is coated on the peelable film formed as in the above first invention to form an acrylic resin film layer thereon, and one or two paints selected from the group consisting of an asphalt paint, a tar paint and a thermosetting resin paint, or resin mortar using a thermosetting resin as a binder is coated on the acrylic resin film layer to form a corrosion-resistant film layer thereon. Then, a molded product of concrete or mortar is formed using this formwork.

BEST MODE OF CARRYING OUT THE INVENTION

Figure 1:
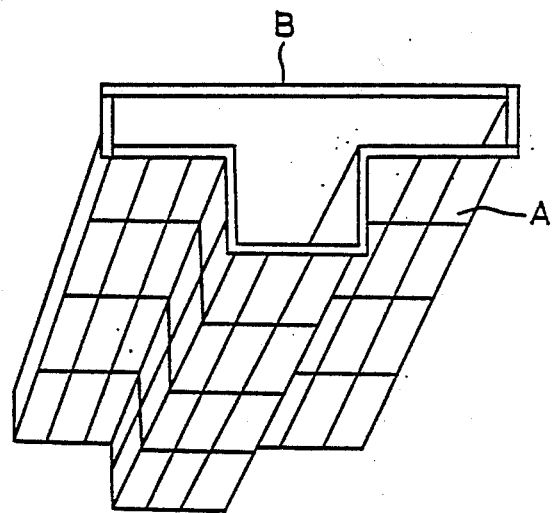
FIG. 1 is a perspective view of a steel formwork of a wall column.

In the present invention, a peelable paint is coated on the inner surface of a formwork to form a peelable film thereon. The peelable paint used in the present invention is also called a strippable paint and has been conventionally coated on the surface of a product to form a peelable continuous film thereon. Such a peelable paint has conventionally been coated on the surface of a product to temporarily protect it so that the product is not damaged or corroded during transportation or storage and peeled after it is used. Although an adhesive force of a peelable film formed by coating this paint is weak, its continuity as a film is good. In addition, the peelable film is relatively soft but strong and therefore can easily be peeled. In the present invention, such as peelable paint is coated on the inner surface of a formwork to form a peelable film thereon. The peelable paint is set to some extent one hour after coating although the set time depends on the type of the paint. However, in order to increase strength of a film, it is preferable to leave the coated paint to stand for two to four hours. An example of the peelable paint used in the present invention is one whose main component is polyvinyl chloride, a vinyl chloride-vinyl acetate copolymer, polyvinyl butyral, polyvinyl alcohol, an ethylene-vinyl acetate copolymer, acrylic resins or the like. These peelable paints are coated on the inner surface of a formwork by a spray or a brush and set to form a peelable film. Then, one or two paints selected from the group consisting of paints of rubber asphalt, asphalt epoxy, tar, tar epoxy, and a thermosetting resin, or resin mortar is coated on the peelable film, thereby forming a corrosive-resistant film layer. Examples of the thermosetting resin are an unsaturated polyester resin, an epoxy resin, a furan resin, a phenolic resin, a polyurethane resin, and an acrylic resin. Note that although thermoplastic and thermosetting acrylic resin paints are present, the thermosetting acrylic resin paint can be used in the present invention. These resins have high watertightness, resistance to wear, and resistance to chemicals. In addition, the resins have high tensile strength and extensible property and therefore can be suitably used in this application. Upon "coating" or "lining" of these paints on the peelable film they may be coated thereon by a trowel, a roller, a brush, or the like.

Note that in the second invention, the corrosion-resistant film layer is not directly formed on the peelable film. That is, a paint of a thermoplastic acrylic resin which is one of acrylic resins having a good resistance to weather is coated on the peelable film to form a film layer thereon. Then, one or two paints selected from the group consisting of an asphalt paint, a tar paint and a thermosetting resin, or a resin mortar using a thermosetting resin as a binder is coated on the resultant layer.

In the present invention, the film formed on the formwork is transferred and coated onto concrete or mortar when the concrete or mortar is removed from the formwork. For this reason, adhesive strength of each film with respect to an adjacent surface is set to become higher toward the molded concrete or mortar. That is, the adhesive strength between the placed concrete or mortar and a film adhered thereto is maximized, the strength between the respective films is gradually reduced from the concrete or mortar toward the formwork surface, and it is minimized between the peelable film and the formwork. No mold-releasing agent is used between the formwork and the peelable film. Therefore, the surface of the transferred film obtained by removing the concrete or mortar from the formwork is kept beautiful.

The formwork having the above-mentioned corrosion-resistant film layer on the peelable film formed on its surface is assembled, and concrete or mortar is placed therein and hardened by a conventional method. It is preferable to place the concrete or mortar when a thermosetting resin coated on the inner surface of the formwork is half-set. Although this timing depends on the typw of the resin, it is normally one to three hours after a paint or a resin mortar is coated on the formwork. As a result, the peelable film is adhered to the corrosion-resistant film layer through or not through an acrylic resin film, and the corrosion-resistant film layer is adhered to the concrete or mortar. That is, the peelable film, the corrosion-resistant film layer, and the concrete or mortar, or the peelable film, the acrylic resin film, the corrosion-resistant film layer, and the concrete or mortar are adhered integrally with each other. In this state, the concrete or mortar is cured. When curing is finished, the formwork is removed. At this time, the peelable film and the corrosion-resistant film layer are peeled from the formwork and transferred to the concrete or mortar while sandwiching or not sandwiching the acrylic resin film layer therebetween. As a result, the surface of the concrete or mortar is coated with the corrosion-resistant film layer and the peelable film having or not having the acrylic resin film layer therebetween. That is, at this moment, corrosion-resistant concrete or mortar is completed. The film layer formed on the surface of the corrosion-resistant concrete or mortar obtained by the present invention has good quality, has no pin-holes on its surface, and is very beautiful. Meanwhile, in the second invention, the acrylic resin film layer is formed below the peelable film. Therefore, the film layer obtained in the second invention has an excellent resistance to weather. In order to improve an outer appearance, durability, or the like of the peelable film, the peelable film transferred onto the concrete surface is preferably peeled. The film can be easily peeled by pulling from its corners. When the film is peeled, a fresh surface of the resin film without contamination or deposit appears. Arbitrary patterns and colors, e.g., are printed on this surface without performing any pretreatment. This patterning is performed using a weather-resistant resin paint added with a pigment. As a result, a concrete molded product having patterns or the like is obtained. If necessary, a transparent or translucent, and preferably, weather-resistant resin paint is coated on the concrete.

The present invention will be described in more detail by way of its Experimental Example.

Experimental Examples

In any of the following experiments, BONCOAT ST-372 (tradename: available from DAINIPPON INK & CHEMICALS, INC.) containing an acrylic resin as its main component was used as a peelable paint, and UNITACK #5000-3 (tradename: available from ONODA CO., LTD.) containing an epoxy resin as its main component was used as a resin (to be simply referred to an an "epoxy resin" hereinafter).

1 Chlorine Ion Permeability Test of Mortar

In this test, 50 mm (diameter)×5 mm (thickness) disk-like samples were sandwiched between two cell containers. A 10% NaCl aqueous solution was charged in one of the containers, and a chlorine ion permeation amount in the other container was measured by an ion meter, thereby calculating a diffusion coefficient. The samples were formed as follows.

That is, a cylindrical number of polyvinyl chloride having an inner diameter of 50 mm and a depth of 5 mm was prepared, a grease was coated on its edge (thickness of the edge: 5 mm), and then the cylindrical member was placed on a glass plate in contact therewith and used as a formwork. A water/cement ratio of mortar was 54.8%, and its cement/fine aggregate ratio was 1:2. The maximum size of the fine aggregate was 2.5 mm. Mortar the surface of which was not treated was used as a basic sample (to be referred to as "non-treatment" hereinafter). The "non-treatment", sample obtained by transferring only a peelable film onto the surface of the basic mortar which contacts the glass (to be referred to as "film transferring" hereinafter), a sample obtained by transferring the peelable film and a 1-mm thick mortar film containing a polymer dispersion having a composition shown in Table 1 onto the surface of the basic mortar (to be referred to as "mortar transferring" hereinafter), a sample obtained by forming a peelable film according to the present invention and a 0.5-mm thick epoxy resin corrosion-resistant film layer on the surface of the basic mortar (to be referred to as "resin transferring" hereinafter), and a sample obtained by post-coating an epoxy resin on the surface of the basic mortar after the mortar was hardened (to be referred to as "resin post-coating" hereinafter) were cured for seven days in a constant temperature and humidity room (20° C., and a RH 90%). Test results are shown in Table 2.

As shown in Table 2, diffusion coefficients of the "film transferring", the "mortar transferring", and the "resin transferring" were much smaller than that of the "non-treatment". However, the diffusion coefficient of the "resin post-coating" was comparatively large because pin-holes were not completely buried.

TABLE 1

| Water/Cement Ratio (%) | Unit Amount (kg/m³) | | | | |
|---|---|---|---|---|---|
| | Water | Cement | Fine Aggregate (1) | Styrene-Butadiene Rubber (Solid Content) (2) | High-Performance Water Reducing Admixture (3) |
| 24.8 | 217 | 880 | 880 | 132 | 18 |

Note
(1) Pit sand having a maximum grain size of 2.5 mm was used.
(2) Onoda CX-B (tradename) available from ONODA CO., LTD. was used.
(3) Mighty 150 (tradename) available from Kao Corp. was used.

TABLE 2

| | Diffusion Coefficient (cm²/s) |
|---|---|
| Non-Treatment | $1.32 \times 10^{-8}$ |
| Film Transferring | $0.04 \times 10^{-8}$ |
| Mortar Transferring | $0.03 \times 10^{-8}$ |
| Resin Transferring | $0.01 \times 10^{-8}$ |
| Resin Post-Coating | $0.43 \times 10^{-8}$ |

2 Freeze-Thaw Test of Concrete

Three 10×10×40 cm concrete samples having a composition shown in Table 3 were formed.

TABLE 3

| Actually Measured Slump (cm) | Actually Measured Air Amount (%) | Water/Cement Ratio (%) | Sand/Aggregate Ratio (%) | Unit Amount (kg/m³) | | | | |
|---|---|---|---|---|---|---|---|---|
| | | | | Water | Cement | Fine Aggregate (4) | Coarse Aggregate (5) | Water Reducing Admixture (6) |
| 21.0 | 3.5 | 58.1 | 46.5 | 180 | 310 | 837 | 971 | 0.78 |

Note
(4) Pit sand having a maximum grain size of 5 mm was used.
(5) River sand having a maximum grain size of 25 mm was used.
(6) Pozolis No. 5L (tradename) available from Pozolis Co.

A freeze-thaw test of the above concrete was performed in accordance with the JIS (Draft), and a weight change and a relatively dynamic modulus of elasticity were measured. Concrete the surface of which was not treated was used as a basic sample (to be referred to as "non-treatment" hereinafter). The "non-treatment", a sample obtained by transferring a peelable film and a 2- to 3-mm thick mortar film containing a polymer dispersion having the composition shown in Table 1 onto the basic concrete (to be referred to as "mortar transferring" hereinafter), a sample obtained by transferring a peelable film according to the present invention and an epoxy resin film layer onto the surface of the basic concrete (to be referred to as "resin transferring" hereinafter), and a sample obtained by post-coating an epoxy resin on the basic concrete after the concrete was hardened (to be referred to as "resin post-coating" hereinafter) were cured with the formworks for seven days in a constant temperature and humidity room (20° C., RH 90%). Note that the mortar containing the polymer dispersion or the epoxy resin was coated on the surface of the placed concrete of each of the "mortar transferring" and the "resin transferring" by a brush on the next day of concrete placing, and the peelable paint was coated thereon by a brush, thereby obtaining a surface similar to that contacting the formwork. The "resin post-coating" was removed from the formwork after six days and the epoxy resin was coated on its surface. An amount of the epoxy resin used in the "resin transferring" and the "resin post-coating" was equally 110 g for each sample.

Weight change percentage after freeze-thaw cycles are shown in Table 4, and those in relative dynamic modulus of elasticity are shown in Table 5.

TABLE 4

| | Cycles | | | | | | | |
|---|---|---|---|---|---|---|---|---|
| | 30 | 70 | 110 | 140 | 180 | 220 | 260 | (%) 300 |
| Non-Treatment | +0.1 | −0.1 | −0.9 | −1.6 | −3.2 | — | — | — |
| Mortar Transferring | +0.3 | +0.5 | +0.7 | +0.6 | +0.3 | −0.6 | −1.4 | −4.2 |
| Resin Transferring | +0.3 | +0.7 | +0.8 | +0.8 | +0.9 | +1.0 | +1.1 | +1.0 |
| Resin Post-Coating | +0.7 | +1.3 | +1.3 | +1.4 | +1.4 | +0.7 | +0.2 | −3.0 |

TABLE 5

| | Cycles | | | | | | | |
|---|---|---|---|---|---|---|---|---|
| | 30 | 70 | 110 | 140 | 180 | 220 | 260 | (%) 300 |
| Non-Treatment | 110 | 105 | 88 | 71 | 55 | 40 | — | — |
| Mortar Transferring | 109 | 106 | 103 | 100 | 93 | 82 | 74 | 69 |
| Resin Transferring | 104 | 105 | 101 | 100 | 102 | 104 | 103 | 103 |
| Resin Post-Coating | 103 | 100 | 91 | 87 | 82 | 71 | 65 | 53 |

3 Chemical Resistance Test of Concrete

In this test, a 10×10×40 cm concrete sample was dipped in a 5% hydrochloric acid (JIS K8180 chemical grade) solution, and a weight change was measured. The test was performed using four samples of concrete having the composition shown in Table 3, i.e., "non-treatment", "mortar transferring", "resin transferring", and "resin post-coating". Following the same procedures as in the freeze-thaw test of concrete, curing of the concrete and post-coating of the resin were performed. Weight changes of the concrete are shown as test results in Table 6.

TABLE 6

| Number of Days of Dipping | 7 | 28 | 56 | 91 | 180 |
|---|---|---|---|---|---|
| Non-Treatment | −17.3 | −46.5 | −55.0 | −64.8 | destroyed |
| Mortar Transferring | +0.4 | +1.0 | −0.6 | −1.7 | −2.5 |
| Resin Transferring | +0.1 | +0.1 | +0.1 | +0.2 | +0.2 |
| Resin Post-Coating | +0.1 | +0.2 | +0.2 | −0.5 | −1.2 |

EXAMPLE 1

Reinforced concrete U-type 240 (JIS) was manufactured using a U-shaped steel formwork.

First, a mold releasing agent on the surface of the formwork was wiped out, and a peelable paint was coated thereon by a brush. BONCOAT ST-372 was used as a peelable paint and uniformly coated by a brush at 50 cc/m$^2$. Coating was performed twice such that second coating was performed there hours after first coating. After a peelable film was formed, resin mortar obtained by mixing UNITACK #5000-3 as an epoxy resin with dry sand in a ratio of 1:0.7 was coated on the film by a brush to a thickness of 2 mm. Thereafter, a formwork was assembled and coated with the resin mortar, and two hours after that, super-plastisized concrete having a water/cement ratio of 35.5%, a unit cement amount of 450 kg/m$^3$, and a slump of 20 cm was placed therein. When the formwork was removed on the next day, the film and the resin mortar were transferred onto the surface of the concrete, and a corrosion-resistant film layer was formed on the entire surface of the concrete which was in contact with the formwork. The surface of the layer was continuous peelable film with luster, and no pin-holes were found.

EXAMPLE 2

In the wall column steel formwork shown in FIG. 1, steel panel A which corresponded to inner walls was assembled. Then, 60 parts of thinner and 3 parts of chromium oxide were mixed with 100 parts of peelable paint STRIP PAINT (tradename) available from KANSAI PAINT COMPANY LTD. and agitated well, and the resultant material was sprayed on the inner surface of panel A at 200 g/m$^2$ by an airless type spray apparatus. The peelable film paint was dried for about an hour. An acrylic resin paint was sprayed on the above paint layer as follows. First, TOPCOATs type-3 (thermoplastic type) and type-4 (thermosetting type) (tradename) available from ONODA CO., LTD. were used as an acrylic resin, and the same amount of thinner was added to each material and agitated. A formwork was divided into three sections beforehand. The TOPCOATs type-3 and type-4 were sprayed on the two sections, respectively, and the remaining one section was not treated. After three hours passed, a material obtained by mixing 50 parts of a hardening agent with 100 parts of epoxy resin UNITACK #5000-3 (tradename) available from ONODA CO., LTD. and agitating the resultant material was sprayed at 800 g/m$^2$ on the TOPCOATs. Thereafter, reinforcements were set at predetermined positions of the formwork, steel formwork B corresponding to outer walls treated following the same procedures as for panel A was assembled, and then the entire formwork was tightened by a spacer, thereby completing setting of the formwork. Concrete was placed from an upper portion of the formwork and compacted by a rod-type vibrator. The formwork was removed on the seventh day. In this case, the formwork at each section could be easily removed from a boundary between the formwork and the peelable film, and the film was transferred onto the concrete. The inverted film was not damaged, and transferring of the film was perfect. A weather resistance test of the above resin-coated concrete was performed as follows. That is, three 30×60×12 (cm) samples were cut out from each of the three sections described above. Two samples were placed on a base installed on the rooftop of a building on the seashore in Kamakura City, Kanagawa Prefecture to perform outdoor exposure. Note that the remaining one was used as an unexposed sample to be compared with the exposed samples. After three months had passed, the surface of the peelable film of the sample having only the epoxy resin and the peelable film lost luster, and film peeling was significant. The sample having the TOPCOAT type-3 between the epoxy resin and the peelable film was excellent without blister and peeling although slight yellowing was found as compared with the unexposed sample. The sample using the TOPCOAT type-4 was perfect with almost no change in luster and color and without blister and peeling.

EXAMPLE 3

The inner surface of a formwork for a concrete precast panel (PC panel) including a bottom plate and side plates was wiped and cleaned. Then, a mixture of 100 parts of peelable paint STRIP PAINT (tradename) available from KANSAI PAINT COMPANY LTD. and 60 parts of thinner was sprayed on the surfaces of the bottom and side plates by an airless type spray apparatus at 200 g/m$^2$. After an hour had passed, the side plates were mounted on outer plates. Epoxy resin UNITACK 5000-3 (trademark) available from ONODA CO., LTD. was sprayed on the plates at 800 g/m$^2$ to complete preparation. A reinforcement cage was arranged at a predetermined position, and concrete was placed therein. The concrete was compacted, surface-finished, and steam-cured by conventional techniques. The formwork was removed from the concrete on the next day. The formwork was easily removed and no peelable film was left on the formwork.

On the next day, the peelable film on the surface was peeled, and two yellow and green acrylic resin paints were sprayed on the exposed pure resin film surface by an airless type spray apparatus to form dotted patterns thereon. The resultant material was dried for two hours, and transparent acrylic resin TOPCOAT (tradename) available from ONODA CO., LTD. was sprayed thereon twice at 100 g/m$^2$, thereby obtaining a product. The product was left to stand in a closed room having a humidity of 60 to 80% for 24 hours. As a result, the dotted patterns were not blurred, and a beautiful PC board similar to that obtained immediately after molding was obtained.

As has been described above, according to the present invention, a continuous corrosion-resistant film is formed on the surface of concrete which is in contact with a formwork simultaneously with removing of the formwork. The film has no pin-holes, is beautiful, and has high adhesive strength. As a result, concrete or mortar having high corrosion resistance and good outer appearance can be easily obtained. Therefore, this method is expected to be widely used instead of a conventional method.

We claim:

1. A method of manufacturing a corrosion-resistant film layer with no pin-holes on concrete or mortar, comprising the steps of:
    coating a peelable paint on an inner surface of a formwork without any intervening release agent to form a peelable film;
    coating one of a thermosetting resin paint and a resin mortar using a thermosetting resin as a binder on said peelable film to form said corrosion resistant film layer thereon;
    molding and curing concrete or mortar using said formwork having said peelable film and said corrosion resistant film layer formed thereon; and
    removing said formwork from said cured concrete or mortar, thereby transferring said corrosion-resistant film layer together with said peelable film onto the surface of said cured concrete or mortar.

2. The method according to claim 1, wherein said peelable paint contains as a main component polyvinyl chloride, a vinyl chloride-vinyl acetate copolymer, polyvinyl butyral, polyvinyl alcohol, an ethylene-vinyl acetate copolymer, or an acrylic resin.

3. A method of manufacturing a concrete molded product having a thermosetting resin film with not pinholes on its surface by transferring said thermosetting resin film coated on a formwork onto said concrete molded product, comprising the steps of:
    coating a peelable paint on a contact surface of said formwork without any intervening release agent to form a peelable film thereon;
    coating a thermosetting resin on said peelable film to form said thermosetting resin film on said peelable film;
    molding and hardening concrete using said coated formwork to form said concrete molded product;
    removing said formwork from said hardened concrete thereby transferring said peelable film and said thermosetting resin film formed on said formwork onto said surface of said concrete molded product to cover said concrete molded product;
    peeling said peelable film to expose said thermosetting film on said surface of said concrete molded product; and
    performing at least one of a coloring operation and a patterning operation on said surface of said molded concrete product having said thermosetting resin film thereon.

4. The method according to claim 3, further comprising the step of coating a transparent or translucent resin paint on said molded concrete product having said thermosetting resin film thereon.

5. A method of manufacturing a corrosion-resistant film layer with no pinholes on concrete or mortar, comprising the steps of:
    coating a peelable paint on an inner surface of a formwork without any intervening release agent to form a peelable film;
    coating a thermoplastic acrylic resin paint on said peelable film to form an acrylic resin film layer thereon;
    coating at least one of a thermosetting resin paint and a resin mortar using a thermosetting resin as a binder on said acrylic resin film layer to form said corrosion-resistant film layer thereon;
    molding and curing concrete or mortar using said formwork having said peelable film, said acrylic resin film layer, and said corrosion resistant film layer formed thereon; and
    removing said formwork from said cured concrete or mortar, thereby transferring said peelable film, said acrylic resin film layer, and said corrosion-resistant film layer onto the surface of said cured concrete or mortar.

6. The method according to claim 5, wherein said peelable paint contains as a main component polyvinyl chloride, a vinyl chloride-vinyl acetate copolymer, polyvinyl butyral, polyvinyl alcohol, an ethylene-vinyl acetate copolymer, or an acrylic resin.

* * * * *